F. J. COLE & F. F. SCOVILLE.
LOCOMOTIVE ENGINE.
APPLICATION FILED JUNE 14, 1909.
936,413.
Patented Oct. 12, 1909.
4 SHEETS—SHEET 4.
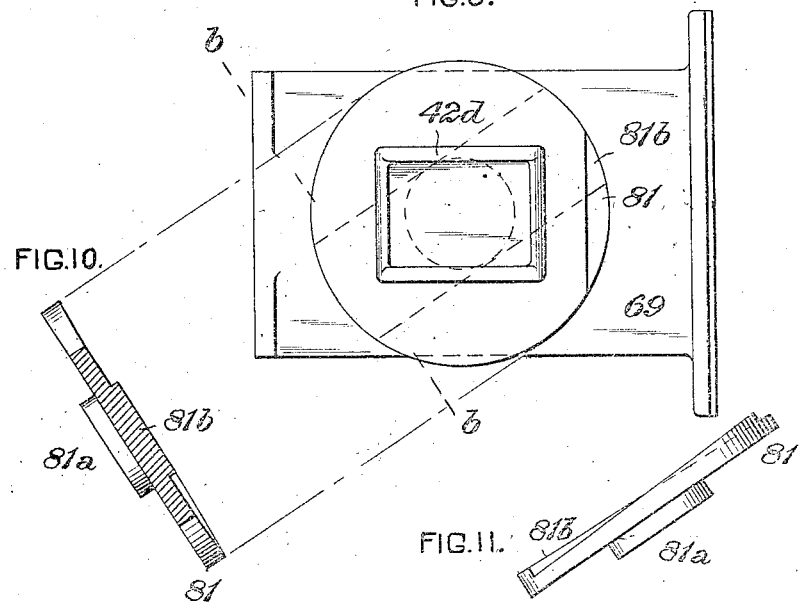
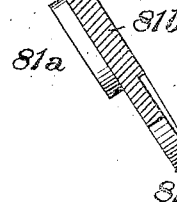
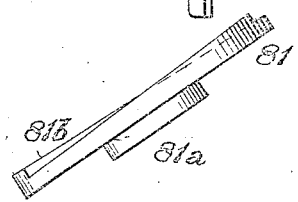
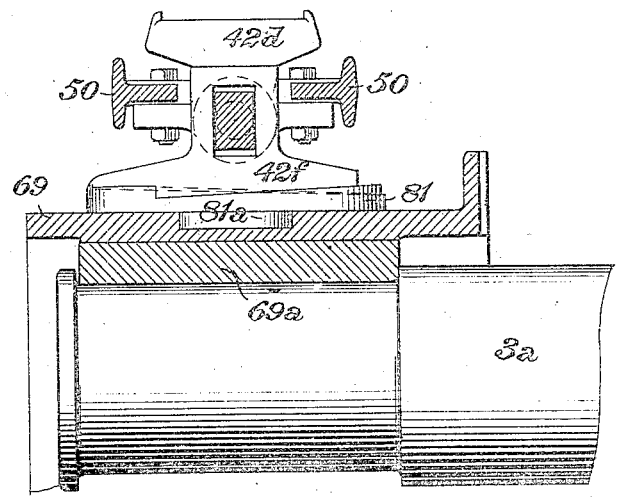

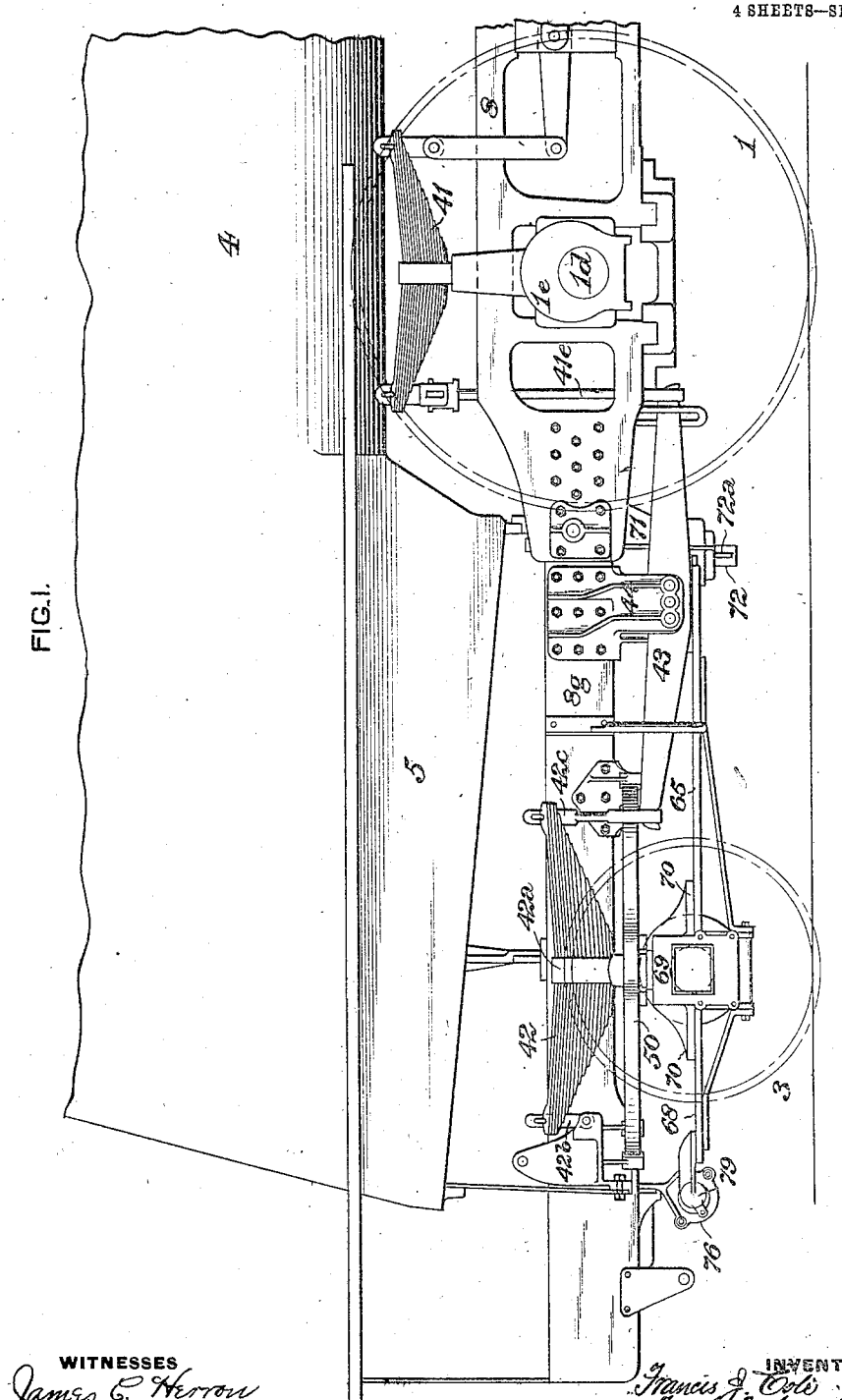

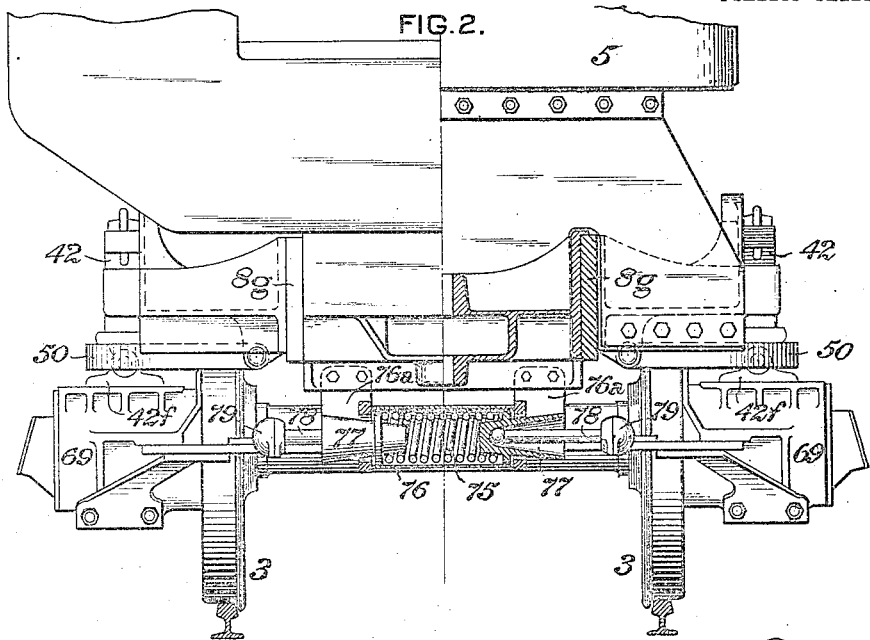
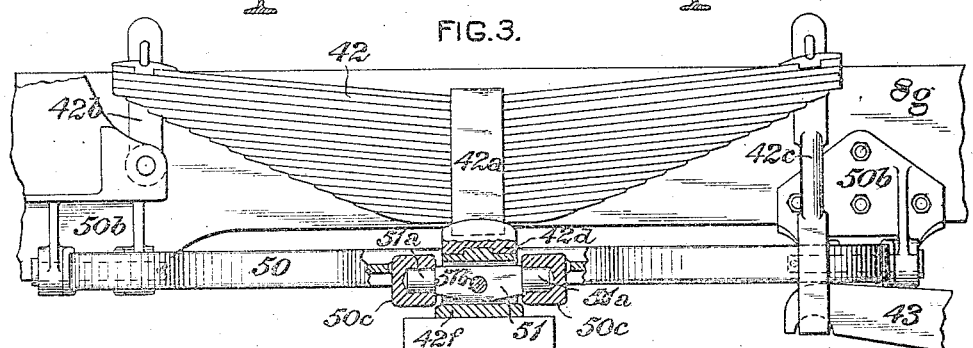
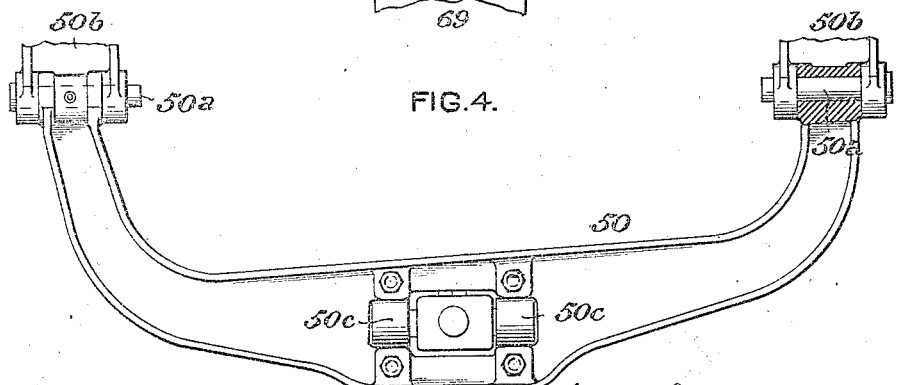

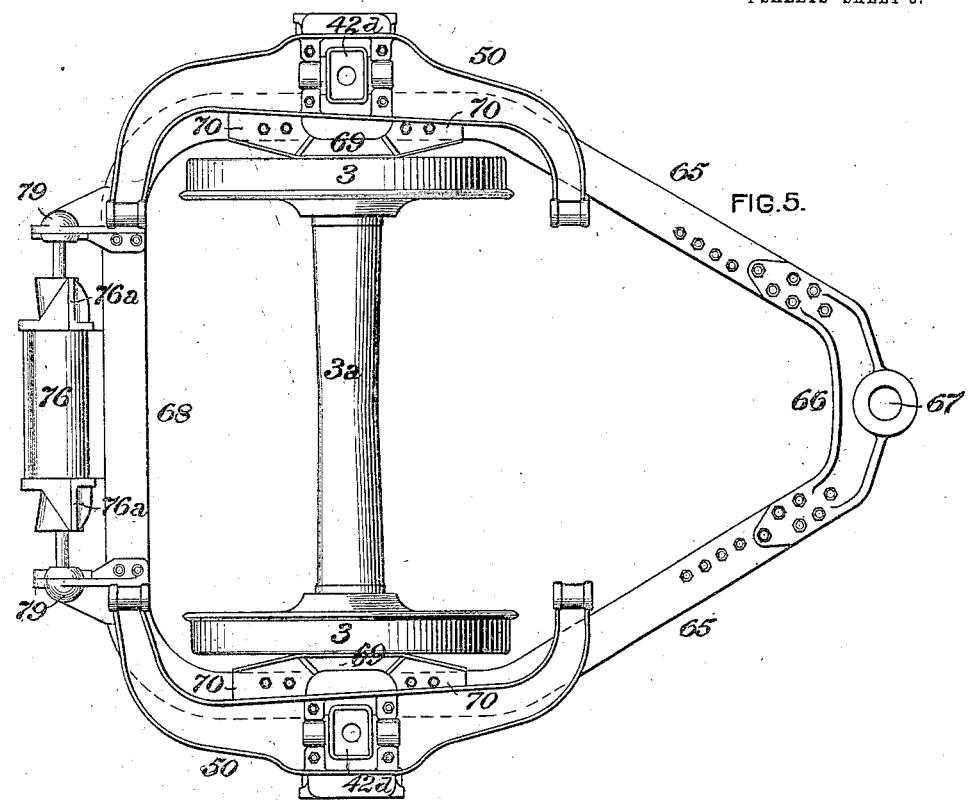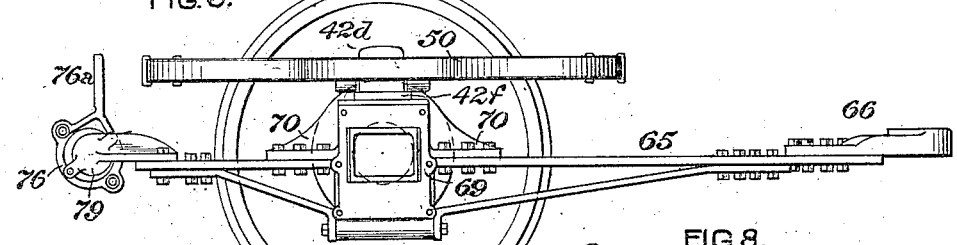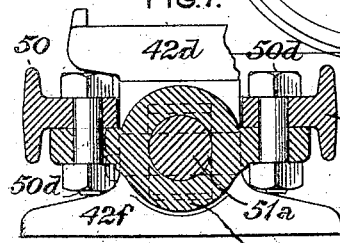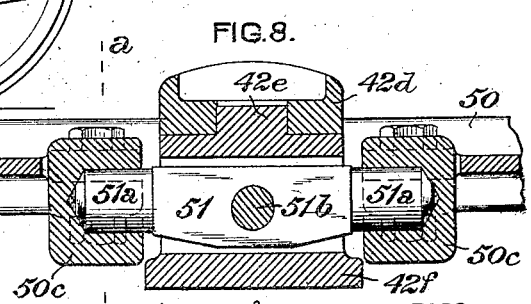

UNITED STATES PATENT OFFICE.

FRANCIS J. COLE AND FRANK F. SCOVILLE, OF SCHENECTADY, NEW YORK.

LOCOMOTIVE-ENGINE.

936,413.  Specification of Letters Patent.  Patented Oct. 12, 1909.

Application filed June 14, 1909. Serial No. 501,956.

*To all whom it may concern:*

Be it known that we, FRANCIS J. COLE and FRANK F. SCOVILLE, both of Schenectady, in the county of Schenectady and State of New York, have jointly invented a certain new and useful Improvement in Locomotive-Engines, of which improvement the following is a specification.

Our present invention is an improvement upon that for which Letters Patent of the United States No. 773,713 were granted and issued to American Locomotive Company, as assignee of Francis J. Cole, under date of November 1, 1904.

The object of our invention is to provide means whereby all the advantages of the improvement of said Letters Patent shall be retained, and the further advantages of a reduction of weight, and of the transverse distance between the centers of the trailing truck journals, and a more perfect maintenance of the normal relation of the springs to the main and truck frames, shall be afforded.

The improvement claimed is hereinafter fully set forth.

In the accompanying drawings: Figure 1 is a side view, in elevation, of the rear portion of a locomotive engine, illustrating an application of our invention; Fig. 2, a rear view, partly in section, of the same; Fig. 3, a side view, on an enlarged scale, of a trailing truck spring and its floating yoke, with the middle portion of the latter in section; Fig. 4, a plan or top view of the floating yoke; Fig. 5, a plan view of the truck, detached; Fig. 6, a side view of the same; Fig. 7, a transverse section, on an enlarged scale, through one of the floating yoke bearings, taken on the line $a\,a$ of Fig. 8; Fig. 8, a longitudinal central section through a pair of said bearings; Fig. 9, a plan or top view of a journal box; Fig. 10, a transverse section through a spring seat friction plate, on the line $b\,b$, of Fig. 9; Fig. 11, a side view, in elevation, of the same; and Fig. 12, a vertical longitudinal central section through a journal box, with a superposed friction plate and spring seat in elevation.

Our invention is, as in Letters Patent No. 773,713 aforesaid, herein illustrated as applied in a locomotive engine having a plurality of pairs of driving wheels, 1, only the rear pair of which is shown, and having its boiler, 4, provided with a wide firebox, 5, which is overhung or set behind the rear driving wheels. The driving wheels are fixed upon axles, $1^d$, the journals of which rotate in boxes, $1^e$, fitted in pedestals in the main frame members, 8, and the overhanging weight of the firebox is carried upon a radial truck, the construction of which will now be described.

The frame of the truck, which is of the two wheeled radial type, is substantially triangular in plan, and is made up of two forwardly and inwardly inclined radius arms, 65, a front connecting plate, 66, which is secured to, and connects together, the forward ends of the arms, 65, and is provided with a center pin socket, 67; a U shaped rear member, 68, and two journal box castings, 69, which form parts of the sides of the truck frame, said castings having lateral arms, 70, which are connected to the radius arms, 65, and to the rear member, 68, respectively.

The portions of the main engine frame members, 8, in which the journal boxes, $1^e$, of the axles, $1^d$, of the driving wheels are fitted, are of the usual bar type, and the portions, $8^g$, of said main frame members which extend rearwardly from the pedestals of the rear driving axle and below the firebox, are made separate from the forward portions, and are deeper and narrower than the latter, to which they are secured removably by transverse bolts adjacent to the rear pedestals. The rear sections, $8^g$, of the main frame members are connected and braced transversely by a suitable cross tie, 71, which is preferably in the form of the expansion cross tie set forth in Patent No. 773,713, and which is provided with bearings or sockets, through which and through the socket, 67, of the truck frame connecting plate, 66, the center pin, 72, of the truck passes, and is held in position by a key, $72^a$, the truck swiveling upon the axial line of the pin, 72.

The lateral movements of the truck are controlled and limited, and the truck normally maintained with its longitudinal central plane in coincidence with that of the locomotive, by a transverse centering spring, 75, which is fitted in a box or case, 76, secured by flanges, $76^a$, to a transverse casting connecting the rear members, $8^g$, of the main frame, and abuts through followers, 77, and thrust rods, 78, on socket lugs, 79, fixed to the rear members, 68, of the truck frame. The centering mechanism is substantially similar in construction and manner of operation to that set forth in Patent No. 773,713, and does not, in and of itself, form part of our present invention.

The truck axle, $3^a$, extends outwardly beyond its wheel seats sufficiently far to provide outside journals, which rotate in journal bearings, $69^a$, fitted in the journal box castings, 69, in the usual manner. The rear main frame members, $8^g$, are supported upon the truck axle through the intermediation of springs, 42, the bands, $42^a$, of which are seated upon the tops of the journal box castings, 69, as presently to be described. The rear ends of the truck springs are connected by spring hangers, $42^b$, to the rear main frame sections, $8^g$, and their forward ends are connected by spring hangers, $42^c$, to the rear ends of equalizers, 43, pivoted in supports, 44, depending from the main frame members, $8^g$. The forward ends of the equalizers are connected to the rear spring hangers, $41^e$, of the springs, 41, of the driving axle, $1^d$, nearest the firebox. The truck spring bands, $42^a$, are supported on the tops of the journal box castings, 69, by means, which will now be described, whereby lateral movement of the latter and other connected members of the truck frame is permitted in passing curves, without displacement of the spring bands and springs; the action of the centering mechanism in thereafter returning the truck to normal central position is aided and supplemented; and the truck springs are guided and controlled so as to be prevented from moving otherwise than vertically, and caused to adjust themselves to the alinement of the journal boxes in any required position, either longitudinal or vertical, without liability to "cocking" of the spring seats.

To these ends, the spring bands, $42^a$, are fitted in spring seats, which rest, either directly or through the intermediation of friction plates, as hereinafter described, on the journal box castings, 69, each of said spring seats comprising an upper socket section, $42^d$, which is provided with a recess in its top to receive the spring band, and is bored out centrally to fit, and be movable about, a cylindrical projection or pivot, $42^e$, on the top of a lower body section, $42^f$. Each of the spring seats, $42^d$, $42^f$, fits freely in a central opening formed in a floating yoke, 50, the ends of which are curved inwardly in front and rear of the adjacent truck wheel, and are coupled, by longitudinally extending pivots, $50^a$, to lugs, $50^b$, on the rear main frame members, $8^g$. A trunnion block, 51, having trunnions or pivots, $51^a$, on its ends, passes freely through a longitudinal opening in each of the spring seat body sections, $42^f$, the trunnions, $51^a$, fitting in sockets in transverse bearing blocks, $50^c$, secured to the adjacent floating yoke by bolts, $50^d$. The trunnion blocks, 51, are coupled to the spring seat body sections, $42^f$, by transverse pins, $51^b$, the projecting ends of which fit in sockets in the body sections and form trunnions at right angles to the trunnions, $51^a$.

It will be seen that by the construction above described, complete freedom for angular movement of the yokes is permitted, and that, in both lateral movements of the journal boxes relatively to the main frame, and vertical movements of the main frame relatively to the journal boxes and truck frame, the springs are retained in their normal relation to the main and the truck frame, and are also always maintained in proper alinement with, and true bearing on, the journal boxes, by means of the right angled trunnion connections of their seats with the floating yokes.

The friction of the spring seat body sections on the tops of the journal boxes acts, in conjunction with the centering mechanism hereinbefore described, to resist the transverse motion of the truck. The entire resistance for centering the truck may, however, be provided as a frictional one, and the independent spring centering mechanism be dispensed with, if desired, by the interposition of inclined plane friction plates, 81, between the spring seats and the journal boxes. As shown in Figs. 9 to 12 inclusive, the friction plates, 81, are provided with central cylindrical projections or bosses, $81^a$, on their lower sides, which fit in corresponding sockets in the tops of the journal boxes, and with transverse tenons, $81^b$, on their upper sides, which fit in corresponding mortises in the bottoms of the spring seat body sections, $42^f$. The friction plates are adjusted so that the tenons stand at an angle to the truck axle, as shown in Fig. 9, and the top surfaces of the friction plates on opposite sides of the tenons, are inclined planes. The abutting surfaces of the corresponding portions of the spring seat body sections are correspondingly inclined, as shown in Fig. 12. It will therefore be seen that lateral movement of the truck frame, in either direction, is resisted by the friction between the abutting inclined plane surfaces of the spring seat body sections and friction plates.

The truck herein set forth embodies the advantages, among others, of enabling the supplemental outside rear frame bars of Patent No. 773,713, and the interposed castings through which they are connected to the main frame bars to be dispensed with, thereby effecting a material reduction in weight. The advantage of the floating yokes and connections over the spring guides of said patent, in the more perfect adjustability of the springs to the alinement of the journal boxes, and in the reduction of necessary distance between the transverse centers of truck journals, will be apparent.

Our present invention, while more particularly designed for application in a trailing truck in locomotive engines having an overhung wide firebox, is not limited thereto, as it may, without variation of essential structural or operative principle, be used in a leading truck. It will also be obvious that features of our invention as herein set forth may be applied in connection with supporting wheels which operate in trucks of other constructions.

We claim as our invention and desire to secure by Letters Patent:

1. In a locomotive engine, the combination of a main frame, driving wheels journaled in bearings therein, a radial truck pivoted to the main frame, springs through which weight borne by the main frame is transmitted to the journal boxes of the truck, and floating connections through which said springs are pivoted, in substantially horizontal planes, to the main frame.

2. In a locomotive engine, the combination of a main frame, driving wheels journaled in bearings therein, a radial truck pivoted to the main frame, springs through which weight borne by the main frame is transmitted to the journal boxes of the truck, seats in which said springs are supported on the journal boxes, and floating connections coupling said spring seats to the main frame in substantially horizontal planes.

3. In a locomotive engine, the combination of a main frame, driving wheels journaled in bearings therein, a radial truck pivoted to the main frame, springs through which weight borne by the main frame is transmitted to the journal boxes of the truck, seats in which said springs are supported on the journal boxes, and pivotal connections, comprising pairs of trunnions set at right angles, coupling said spring seats to the main frame.

4. In a locomotive engine, the combination of a main frame, driving wheels journaled in bearings therein, a radial truck pivoted to the main frame, springs through which weight borne by the main frame is transmitted to the journal boxes of the truck, seats in which said springs are supported on the journal boxes, and floating yokes, pivoted at their ends to the main frame and coupled centrally to the spring seats.

5. In a locomotive engine, the combination of a main frame, driving wheels journaled in bearings therein, a radial truck pivoted to the main frame, springs through which weight borne by the main frame is transmitted to the journal boxes of the truck, seats in which said springs are supported on the journal boxes, floating yokes, pivoted at their ends to the main frame, and pivotal connections, comprising pairs of trunnions set at right angles, coupling said floating yokes to the spring seats.

6. In a locomotive engine, the combination of a main frame, driving wheels journaled in bearings therein, a radial truck pivoted to the main frame, springs through which weight borne by the main frame is transmitted to the journal boxes of the truck, seats in which said springs are supported on the journal boxes, floating yokes, pivoted at their ends to the main frame and surrounding the spring seats at their centers, trunnion blocks fitting freely in the spring seats, transverse trunnions coupling the trunnion blocks to the spring seats, and longitudinal trunnions coupling the trunnion blocks to the floating yokes.

7. In a locomotive engine, a floating yoke of U form having sockets in its ends for the reception of main frame coupling pins and an opening in its middle portion for the reception of a truck spring seat.

8. In a locomotive engine, the combination of a truck spring seat having a longitudinal through passage, a trunnion block fitting freely in said passage and having trunnions on its ends, transverse trunnions fixed to said block and fitting in sockets in the spring seat, a floating yoke surrounding the spring seat, and bearing blocks secured to said floating yoke and having sockets receiving the end trunnions of the trunnion block.

9. In a locomotive engine, the combination of a main frame, driving wheels journaled in bearings therein, a radial truck pivoted to the main frame, springs through which weight borne by the main frame is transmitted to the journal boxes of the truck, seats in which said springs are supported, with the capacity of relative movement, on the journal boxes, pivotal connections coupling said spring seats to the main frame, and means for imposing an increased degree of frictional resistance between said spring seats and the journal boxes.

10. In a locomotive engine, the combination of a main frame, driving wheels journaled in bearings therein, a radial truck pivoted to the main frame, springs through which weight borne by the main frame is transmitted to the journal boxes of the truck, seats in which said springs are supported, with the capacity of relative movement, on the journal boxes, pivotal connections coupling said spring seats to the main frame, and friction plates interposed between the journal boxes and spring seats and having inclined faces abutting on corresponding faces on the spring seats.

FRANCIS J. COLE.
FRANK F. SCOVILLE.

Witnesses:
S. W. TYLER,
CHAS. J. ROGERS